(12) United States Patent
Wright et al.

(10) Patent No.: US 6,330,312 B1
(45) Date of Patent: Dec. 11, 2001

(54) COMMUNICATIONS NETWORK

(75) Inventors: Anthony D. Wright, Ilford; Juan R. Harrison, Billericay, both of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/336,761

(22) Filed: Jun. 21, 1999

(30) Foreign Application Priority Data

Jun. 26, 1998 (GB) .................................................. 9813928

(51) Int. Cl.⁷ .................................................. H04M 15/00
(52) U.S. Cl. .................. 379/112.06; 379/114.14; 379/126; 379/127.02; 379/132
(58) Field of Search ..................... 379/111, 113, 379/115, 119, 121, 126, 132, 133, 207, 229, 230

(56) References Cited

U.S. PATENT DOCUMENTS

| 5,509,055 | * | 4/1996 | Ehrlich et al. ........................ 379/133 |
| 5,712,908 | * | 1/1998 | Brinkman et al. .................... 379/119 |
| 6,233,313 | * | 5/2001 | Farris et al. .......................... 379/34 |

\* cited by examiner

*Primary Examiner*—Binh Tieu
(74) *Attorney, Agent, or Firm*—Nixon & Vanderhye P.C.

(57) ABSTRACT

In a communications network, the duration of a pre-answer phase of a call is recorded with reference to a number of signalling events associated with the set-up of the call. A billing record may be generated corresponding to the recorded pre-answer phase and may be used, for example, to bill customers carrying out stealth polling of terminals on an ISDN network.

8 Claims, 6 Drawing Sheets

| Billing Aspects | | Signalling Aspects |
|---|---|---|
| Start call duration timer and store ISUP event causing entry to the pre-answer phase | Pre Answer Phase | ← Indication of "Set-up message generated" |
| Record that the call is alerting | | ← Indication that the call is alerting |
| Capture call details for the pre-answer phase | | ← Indication that called customer answererd or released If answered |
| Call duration timer carries on running, if no pre-answer phase the call duration timer is started | Answer Phase | ← |
| Capture call details for the answer phase | | ← Call Released |

Fig. 4.

| Billing Aspects | | Signalling Aspects |
|---|---|---|
| Start call duration timer and store ISUP event causing entry to the pre-answer phase | Pre Answer Phase | ← Indication of "Set-up message generated" |
| Record that the call is alerting | | ← Indication that the call is alerting |
| Capture call details for the pre-answer phase | | ← Indication that called customer answererd or released If answered |
| Call duration timer carries on running, if no pre-answer phase the call duration timer is started | Answer Phase | ← |
| Capture call details for the answer phase | | ← Call Released |

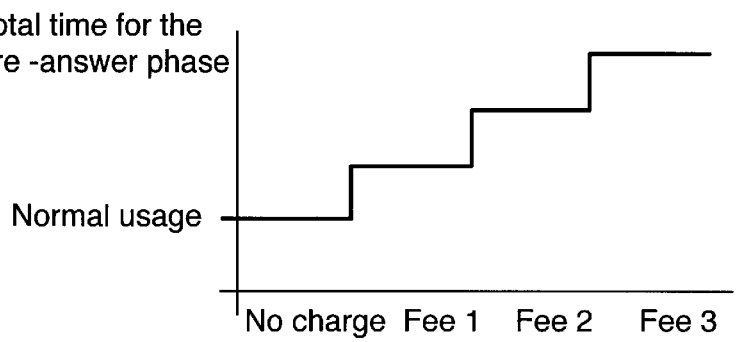

Fig.7. Total time for the pre-answer phase

Normal usage

No charge  Fee 1  Fee 2  Fee 3

COMMUNICATIONS NETWORK

BACKGROUND OF THE INVENTION

When a customer has an analogue telephony service (so called POTS—Plain Old Telephony Service) and makes a call, the call duration timer starts when the called customer answers. This approach is valid since customers can not get advantage from the call until they are able to converse and this occurs at call answer. The call duration timer stops at release of the call and for normal calls the duration of the call is one of the parameters which affects the amount the calling customer is charged. Calls in an Integrated Services Digital Network (ISDN) domain have followed the approach adopted for POTS, that is the duration timer and hence charging is related to called customer answer. The situation for ISDN calls is not the same as POTS calls since users of the ISDN can misuse some of the ISDN features and gain advantage from the end-to-end signalling and/or bearer connection before the called user answers.

A typical scenario where the ISDN signalling protocol is misused is to perform so-called stealth polling. In this situation, the calling user makes a call of a prearranged type which the called user rejects with a prearranged cause value. The rejection message is transported by the network back to the calling user. The advantage to the calling user is that by receiving the rejection message they know that the called user's equipment and line are working.

SUMMARY OF THE INVENTION

According to a first aspect of the present invention, a method of timing a call made over a communications network comprises the step of recording the duration of a pre-answer phase of the call with reference to a number of signalling events associated with the set-up of the call.

According to a second aspect of the present invention, an exchange for a communications network comprises a call processing system which is adapted to capture information relating to the duration of a pre-answer phase for a call made over the communications network by detecting a number of signalling events associated with the set-up of the call.

According to a third aspect of the present invention, a communications network comprises a local exchange according to the second aspect of the present invention, and a billing system connected to the local exchange for processing billing records passed to the billing system from the local exchange, whereby the billing system is adapted to process a billing record for a call to determine a charge for the pre-answer phase of the call.

According to a fourth aspect of the present invention, a program storage device containing computer executable instructions for performing the method of the first aspect of the present invention.

According to a fifth aspect of the present invention, a program storage device containing computer executable instructions for processing a billing record generated by the method of the first aspect of the present invention to determine a charge for the pre-answer phase of a call.

According to a sixth aspect of the present invention, an exchange for a communications network comprises a call processing system which is adapted to generate a message for signalling via the network to a remote exchange serving a calling user to indicate that a call has been diverted by a called user.

Preferably, for an ISDN call, the call processing system of the exchange is adapted so that in the event that it determines that a DSS1 Facility message including a Diversion Information invoke component has been delivered, then an ISUP call control message which includes a Call diversion information parameter is sent towards the remote exchange and including an Access delivery information parameter indicating in bit A "no Set-up message generated" and in bit B "notification of forwarding generated".

Since customers can gain advantage prior to answer on ISDN calls the charging method needs to be different from POTS in some instances to address this issue. The ISDN call can be seen to have two potentially chargeable phases, namely a pre-answer phase and a post-answer phase. The present invention provides a mechanism for the creation of billing records for each phase of the call, thereby providing the potential for calling customers to be charged for the pre-answer phase of the call.

BRIEF DESCRIPTION OF THE DRAWINGS

An example of the present invention will now be described in detail with reference to the accompanying drawings, in which:

FIG. 4 illustrates the relationship between the signalling and billing aspects in a typical ISDN call;

FIG. 7 shows an example of a pricing algorithm for charging for the pre-answer phase of a call.

DETAILED DESCRIPTION

The following example is described with reference to the public Narrowband ISDN. However, the concept is extendible to other signalling/transport domains such as Broadband ISDN (B-ISDN). Furthermore, it is possible that a new service for analogue telephony customers could result in a significant amount of additional information being passed to the analogue customer as part of call establishment, for example an enhanced version of the Caller Display service. If this information could be used to derive benefit from the network without charging being raised then the requirements for the new service could be extended to include the use of the concepts described in the present application.

Unless defined otherwise, ISUP signals and procedures are as defined in ITU-T Recommendations Q.761, Q.762, Q.763 and Q.764 (ETS 300 356-1 is the European application of these documents and PNO-ISC/SPEC/007 is the UK application of these documents). Also, DSS1 signals and procedures are as defined in ITU-T Recommendations Q.931 (ETS 300 403-1 is the European application of this document). Finally, interworking between ISUP and DSS1 is as defined in ITU-T Recommendation Q.699 (ETS 300 899 is the European application of this document).

The present invention will be described with reference to the case where the originating and destination LE functions are separate entities communicating via ISUP signalling. When both functions are provided by the same entity (an own-exchange call) then the internal signalling within that entity would be arranged to produce the same effect as if these functions were communicating via ISUP signalling.

Figure 1:
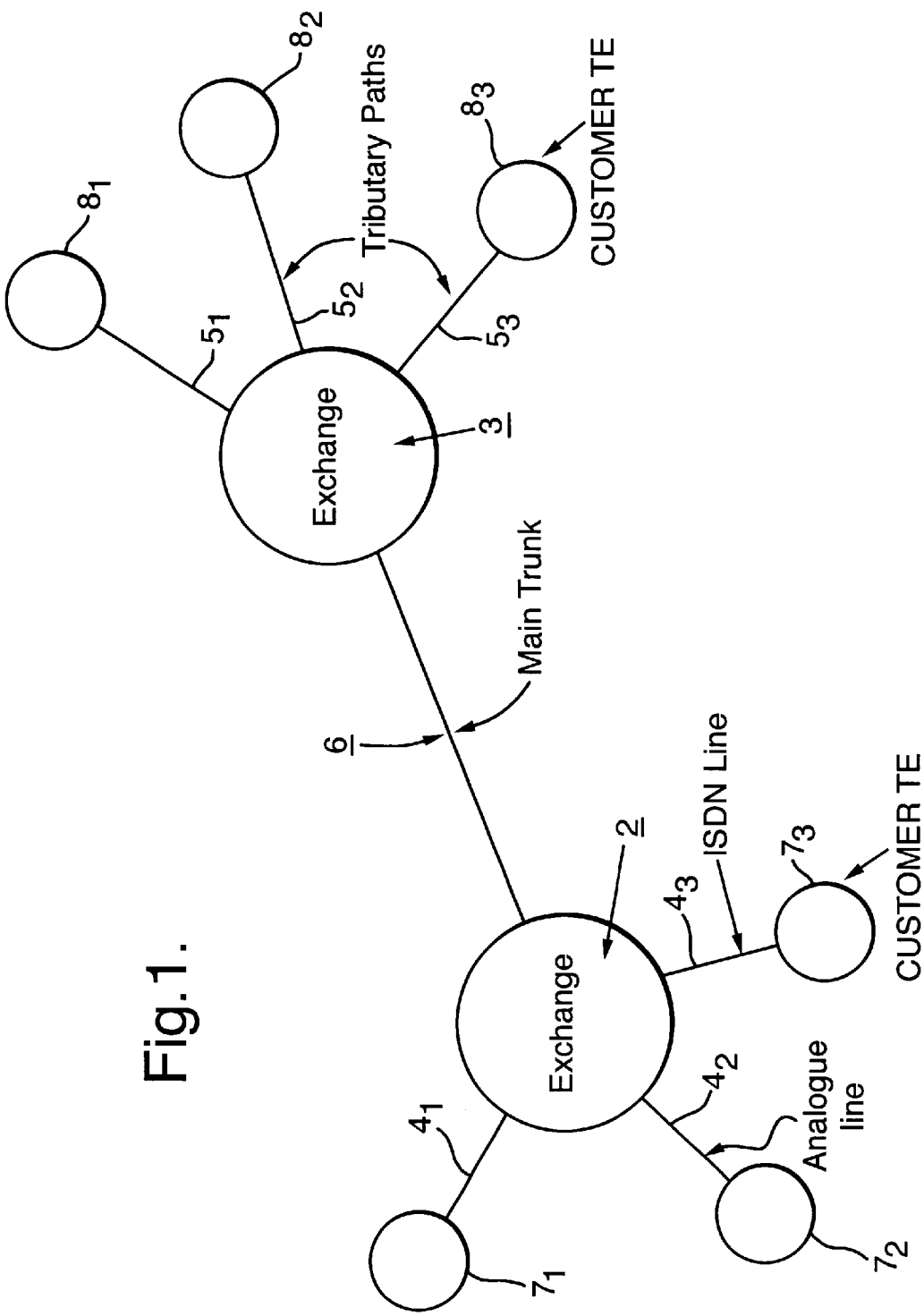
FIG. 1 shows a simplified general telephone network.

FIG. 1 shows a simplified general telephone network 1 with local exchanges 2 and 3 (LEs) connecting a number of tributary paths 4 and 5 to a main trunk 6, with some of the tributary paths being ISDN lines connected to customer's terminating equipment 7 and 8 and others being conventional analogue lines. A call is established from one customer (the calling user) on one exchange to another customer (the called user) on either the same exchange or another exchange using protocols which are well known to the skilled person. As will be described in detail below, to provide a mechanism for charging for the pre-answer phase of a call made on an ISDN connection a number of modifications need to be implemented in the network software used to capture, record and bill the call.

Figure 2:
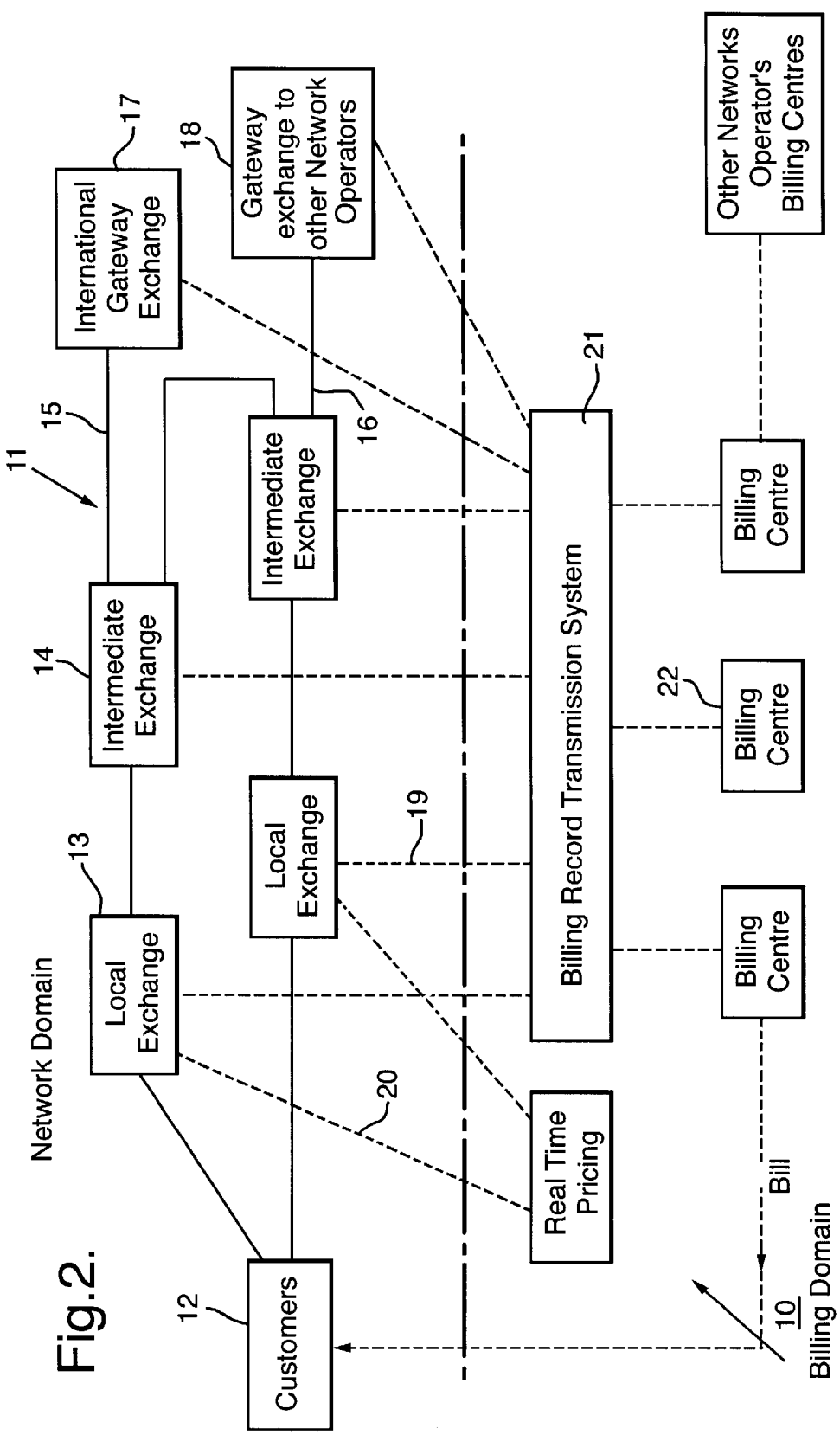
FIG. 2 is a schematic block diagram of a billing domain and a network domain of a network.

FIG. 2 is a schematic of the billing domain 10 and network domain 11 of a network and the links between them. The network domain 10 consists of all those elements needed to provide telecommunications services to analogue and ISDN customers 12, for example analogue to analogue, ISDN to ISDN, analogue to ISDN, or ISDN to analogue calls.

The network domain 11 has responsibility for collecting data relating to the call and outputting the data into the billing domain 10. The network domain 10 is an open domain because it needs to conform to national or International standards in relation to the links between the customer's equipment and the LE 13 serving that customer, the intra-network links between LEs 13 (possibly via intermediate national exchanges 14), and also links 15 and 16 between a particular network operator's network domain and the network domains of other network operators either in the UK (via an interconnect gateway 18) or in other countries (via an International gateway 17). The billing domain 10 is considered as proprietary to the network operator as are the links 19 and 20 between the network domain 11 and the billing domain 10, and the format of the billing records th at go across these links via a billing record transmission system 21 to billing centres 22. In order to describe the present invention, the billing record format is considered to have similar capabilities in those described in the emerging International standards for this interface (prI-ETS 300 819).

Figure 3:
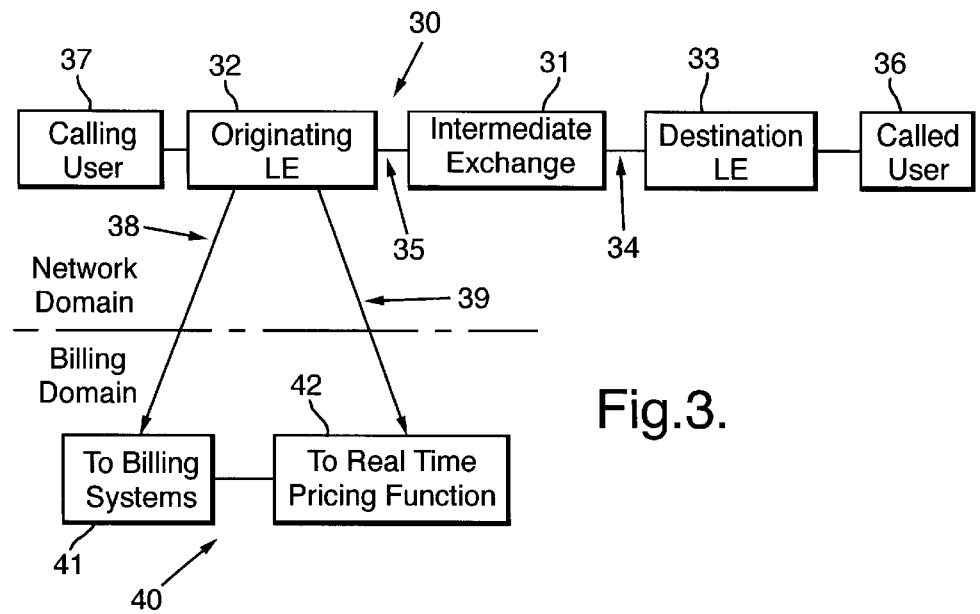
FIG. 3 shows a schematic of the elements in a network domain and the interfaces involved in the signalling and charging for ISDN calls.

FIG. 3 shows a schematic of the elements in a network domain 30 and the interfaces that are involved in the signalling and charging for ISDN calls. The diagram represents all the elements that could be involved, however they need not all be involved in a given call. In particular, in some call cases the intermediate exchange 31 need not be present. Also, as mentioned above, the call could be an own-exchange call with one LE 32 and 33 providing both the originating and destination LE functions of the call. In the normal call case, the originating customer pays for the call and the call's details are captured in a billing record created at the originating LE 32. Some services allow alternative billing arrangements (e.g. toll free calls are billed to the called customer) and to implement these charging services Intelligent Network (IN) call/service control may be used in the network domain.

The element which knows that the pre-answer phase has started is the destination LE 33 and this occurs when it sends the DSS1 Set-up message on the called user's access interface. When the destination LE 33 has sent the DSS1 Set-up message this is indicated to the originating LE 32 via network interface 34 by using the ISUP Access delivery information parameter set to indicate "Set-up message generated" in an appropriate ISUP message.

If an intermediate exchange 31 is involved then it receives the ISUP message from the destination LE 33 on network interface 34 containing the indication "Set-up message generated". The intermediate exchange 31 forwards this indication unmodified on network interface 35 in an appropriate ISUP message. On receipt of the ISUP message from network interface 35 containing the Access delivery indicator parameter indicating "Set-up message generated", the originating LE 32 starts a call duration timer to time the pre-answer phase of the call. The originating LE 32 records the ISUP event which caused entry to the pre-answer phase. Typically there are three possible call scenarios that could now occur:

(i) the called user terminal(s) 36 ignores the DSS1 Set-up message and the call is released due to DSS1 protocol timer expiry;

(ii) the called user terminal(s) 36 aborts the call by initiating DSS1 protocol call clearing procedures; or, (iii) a called user terminal(s) 36 responds to the DSS1 Set-up message and indicates that it is alerting.

If either (i) or (ii) above occurs then the originating LE 32 will receive an ISUP message which causes the call to be released according to ISUP/DSS1 call procedures. Prior to the release of the call the call duration timer is stopped and the information relating to the call is output to create a network domain billing record. As well as the parameters normally captured, there are additional parameters to indicate that the call has progressed to the pre-answer state and has then been released before alerting, and to indicate the ISUP event which caused entry to the pre-answer phase.

If (iii) above occurs then the originating LE 32 receives an ISUP indication that the call is in the alerting state. The call will then progress according to ISUP/DSS1 call procedures. The call duration timer continues to run and the additional information that the call has progressed to the alerting state is stored with the previously stored information on the ISUP event which caused entry to the pre-answer phase.

If the call reaches the alerting state at the originating LE 32 then typically there are two possible call scenarios that could occur, namely:

(i) no further response from the called user's terminal(s) 36 in which case the call is released due to protocol timer expiry; or, (ii) a called user's terminal 36 answers the call.

If (i) above occurs then the originating LE either receives an ISUP message or responds to an internal event (eg timer expiry) which causes the call to be released according to ISUP/DSS1 call procedures. Prior to the release of the call the call duration timer is stopped and the information relating to the call is output to create a network domain billing record. As well as the parameters normally captured, there are additional parameters to indicate that the call has progressed to the alerting state and has then been released, and to indicate the ISUP event which caused entry to the pre-answer phase.

If (ii) above occurs then the originating LE 32 receives an ISUP indication that the call has been answered. The call then progresses according to ISUP/DSS1 procedures. The time from the start of the pre-answer phase to the receipt of the answer signal is captured, and the call duration timer continues to run.

The output of the data for the pre-answer phase of the call is dependent upon the type of call record used by the network provider. If the network provider uses a fixed format of call record then the call data may need to be output as a partial call record. In addition to the parameters normally captured, this record also contains additional parameters to indicate that the call has progressed to the answered state and to indicate the ISUP event which caused entry to the pre-answer phase. Alternatively, if the network provider uses a free format style of billing record then the data is stored until the end of the call when it is then output as additional parameters in the call record.

The billing domain 40 has knowledge of the network domain 30 it serves and processes the data from the network domain 30 to provide the bill that goes to the customer. The relationship between the signalling and billing aspects in a typical call case is shown in FIG. 4. Following normal procedures the billing domain 40 solicits billing records from the originating LE 32 via network interface 38 to a billing system 41. In the present invention, the billing records that are output via network interface 38 result in an increase in the volume since billing records are now being provided for calls which do not reach the answered phase. Where a network provider has a fixed format record and outputs partial call records for the pre-answer phase the volume would more than double. Otherwise, for free format billing records there will be an increase in size since the billing records will contain a number of new fields which capture data relating to the pre-answer phase of the call.

For ISDN Advice Of Charge (AOC) supplementary services, the network communicates with a real-time pricing function 42 via network interface 39 to get details of the charges for the call. Where required by the specific instance of the AOC supplementary service, the AOC supplementary service function advises the real-time pricing function as the call progresses through the pre-answer, pre-answer (alerting indicated) and answered phases.

The billing record transmission system (see FIG. 2) needs to be able to handle the increased volume of data due to the increase in the number and size of the billing records that will result from the production of billing records that include details of the pre-answer phase of the call. The fields relating to pre-answer phase are included in a record for which the administration has defined the format, so any changes in handling new formats is dependant upon the decisions of the network operator. Where a network operator has a fixed format billing record a preferred option is to create partial call records for the pre-answer phase, relying on the billing system to piece together the partial call records into a complete call record. The mechanism for doing this is an extension of the established procedures for piecing together partial call records that are output for long duration calls. The call pricing engine is the area most affected in the billing system 41 as it has to run one or more algorithms for pricing the pre-answer phase of the calls. Whilst call pricing is a matter for the network operator some suitable algorithms will be identified below.

The final stage is the production of the actual bill sent to the customer. The format of this is dependant upon the particular pricing algorithm chosen by the network operator and also the existing format used.

Figure 5:
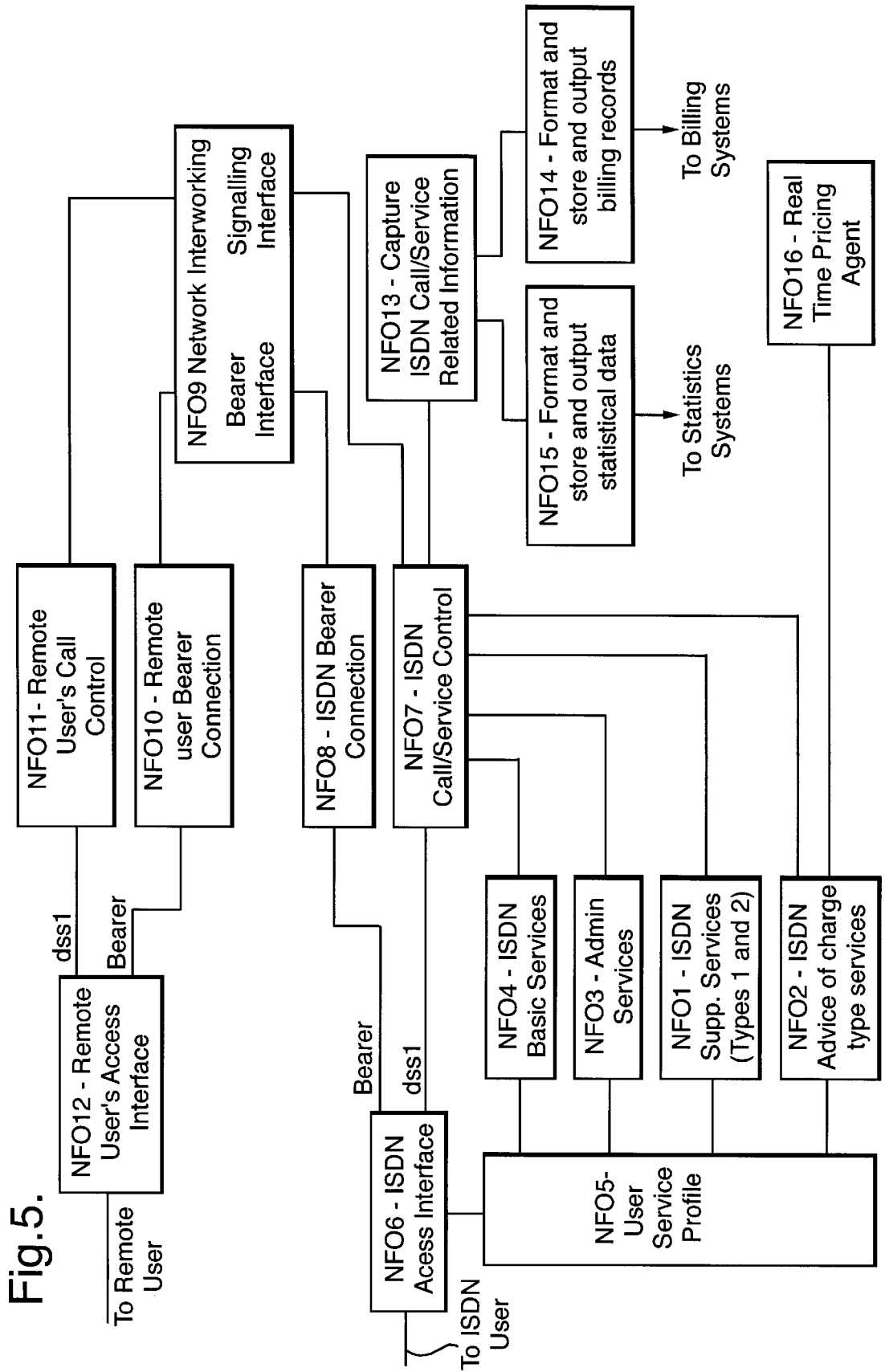
FIG. 5 shows a model of the network computer software functions used in the set-up and charging for a call on an ISDN connection.

The provision of the feature for charging for the pre-answer phase of an ISDN call requires signal interworking within a network and between networks. FIG. 5 shows a model of the network computer software functions, or network functional objects (NFOs), used in the set-up and charging for a call on an ISDN connection. This network software model is well known to the skilled person and therefore only the network functional objects that are directly affected by the charging for the pre-answer phase of the call are considered in the following descriptions:

NFO 1 represents the ISDN Supplementary Services. Each supplementary service has different functionality and so there may be several instances of NFO1 involved in a single call. The supplementary services can be considered as being one of two types from a charging perspective. Type 1 supplementary services are those services for which the administration may require a charge to be raised relating to the use of the service. Type 2 supplementary services are those services for which the administration does not require a charge to be raised relating to the use of the service. The Type 1 supplementary services could be used during the pre-answer phase of the call and so the administration needs to identify the output that is to be included in the billing records for the pre-answer phase.

NFO 4 represents the ISDN Basic Services and the concept of charging for the pre-answer phase of ISDN calls is limited to ISDN circuit switched calls.

NFO 5 is the User Service Profile and allows a user (or group of users ) to have a set of data on the local exchange that provides details of the services (basic or supplementary) available to the user and the configuration of these services. The creation of a billing record for the pre-answer phase of an ISDN call could, where a network operator uses a fixed format billing record, double the number of billing records produced by the LE. An appropriate algorithm may be provided within the LE which limits the creation of the billing records for the pre-answer phase which is dependant upon a user=s subscription option. In this case the option is stored in the User Service Profile. The call/service control function (NFO 7) accesses the User Service Profile in NFO5 via NFO4 for the basic service that is requested in the call set-up message.

NFO 7 is the ISDN(DSS1) call/service control network functional object. This function controls the call and any interactions with the basic call that may result from the introduction of the feature of charging for the pre-answer phase of the call.

NFO 9 comprises the function that maps the DSS1 messages from the call control into the network signalling (ISUP), that transits the ISUP messages to the distant end and then maps the ISUP back to the access protocol used at the destination end. In this case the call is ISDN end-to-end and so the mapping will be in accord with ETS 300 899. Any intermediate node involved in the call will not modify the messages being used to provide the indication that information has been delivered to the remote user.

NFO 13 is the network functional object which captures ISDN call/service related information from NFO 7. This function captures the information that the pre-answer phase has been entered and outputs data to NFO 14 when the pre-answer phase ends. NFO 13 is considered to capture the billing data described in ETS 300 819.

NFO 13 outputs information on the pre-answer phase of calls to NFO 15, dependant upon the administration's requirements for statistics data.

NFO 14 stores and outputs the billing data relating to ISDN calls in a format which is suitable for the administration's billing support systems.

NFO15 stores and outputs the statistics data relating to ISDN calls in a format suitable for the administration's statistics support systems. Typical statistics data for the pre-answer phase of ISDN calls include:

(i) number of calls with pre-answer phase less than 10 seconds and answered;

(ii) number of calls with pre-answer phase less than 10 seconds and not answered;

(iii) number of calls with pre-answer phase less than 20 seconds and answered;
(iv) number of calls with pre-answer phase less than 20 seconds and not answered;
(v) number of calls with pre-answer phase less than 30 seconds and answered;
(vi) number of calls with pre-answer phase less than 30 seconds and not answered;
(vii) number of calls with pre-answer phase less than 1 minute and answered;
(viii) number of calls with pre-answer phase less than 1 minute and not answered;
(ix) number of calls with pre-answer phase less than 2 minutes and answered;
(x) number of calls with pre-answer phase less than 2 minutes and not answered;
(xi) number of calls with pre-answer phase greater than 2 minutes and answered;
(xii) number of calls with pre-answer phase greater than 2 minutes and not answered; and,
(xiii) call counts relating to each of the reasons for entering the pre-answer phase.

NFO16 is the real time pricing function which provides call pricing data for use by the ISDN advise of charge services. Depending upon the administration=s policy on call pricing changes, this function may be needed to reflect the raising of charges for the pre-answer phase of the call.

ITU-T Recommendations Q.764 and Q.699 describe that when the call control logic in the LE serving the called or potentially diverting User determines that the DSS1 Set-up message has been delivered towards the User by the access signalling system, then the first available ISUP call control message to be sent towards the originating LE includes an Access delivery information parameter indicating in bit A "Set-up message generated". The ISUP message used may be the Address complete message, the Call progress message, the Answer message, the Connect message or the Release message depending on implementation and call circumstances. Otherwise, the Access delivery information parameter is not included in an ISUP message. The receipt of the first ISUP Access delivery information parameter indicating "Set-up message generated" initiates the pre-answer phase for that call. On initiating the pre-answer phase the originating LE:

(i) starts the call duration timer;
(ii) records the event initiating the pre-answer phase, i.e. ISUP Access delivery information parameter indicating "Set-up message generated", together with the ISUP message type conveying the indication; and,
(iii) sets an information delivery counter to value 1.

During the pre-answer phase, the receipt of any subsequent ISUP Access delivery information parameter indicating "Set-up message generated" causes the information delivery counter to be incremented by one. This condition may arise as a result of the call experiencing one or more instances of certain of the Call diversion supplementary services causing DSS1 Set-up information to be delivered to more than one User.

During the pre-answer phase, the first indication that the call has entered the Alerting state is recorded. This event is identified by the receipt of either an ISUP Address complete message indicating "subscriber free" in the Called part status indicator of the Backward call indicators parameter, or an ISUP call progress message indicating "alerting" in the Event indicator of the Event information parameter. A subsequent indication of Alerting received (for example, as a result of the call experiencing one or more instances of certain of the Call diversion supplementary services) has no effect on the pre-answer phase record.

The pre-answer phase is terminated by either the receipt of an ISUP Answer or Connect message or one of the following events before the ISUP Answer or Connect message is received:

(i) receipt of an ISUP Release message;
(ii) call clearing initiated by the calling User; or,
(iii) other exceptional conditions in the originating LE which cause release of the call such as fault conditions, protocol error conditions, maintenance action and administrative action.

The duration of the pre-answer phase is then recorded.

If the pre-answer phase is terminated as a result of receiving either an ISUP Answer or Connect message then the call duration timer continues to run in the Answered phase. The pre-answer phase duration is captured along with the other information recorded during the pre-answer phase. All the information related to the pre-answer phase is made available to the function which captures the ISDN Call/Service related information.

If the pre-answer phase is terminated in any other way then the call duration timer is stopped and the information recorded during the pre-answer phase is made available to the function which captures the ISDN Call/Service related information.

Although the events described above can be regarded as independent, there are three special cases:

(i) if the ISUP Access delivery information parameter initiating the pre-answer phase is received in an ISUP Connect message then the pre-answer phase information is recorded with a zero duration between the start of the pre-answer phase and the answer signal. The call duration timer continues to run in the Answered phase;
(ii) if the ISUP Access delivery information parameter initiating the pre-answer phase is received with an ISUP indication that the call has entered the Alerting state then the pre-answer phase Alerting indication is recorded along with the initial pre-answer phase information; and,
(iii) if the ISUP Access delivery information parameter initiating the pre-answer phase is received in an ISUP Release message then the pre-answer phase information is recorded with a zero duration.

If a network provider uses a fixed format output for the Billing Record then there may not be enough free fields to include the data for the pre-answer phase. In this case, the network provider could produce a separate billing record for the pre-answer phase and mark this as a partial billing record. This approach would more than double the number of Billing Records being sent into the billing system. Congestion of the network provider billing record transmission system could result from the increased in numbers of billing records. As mentioned above consideration should be given to limiting the number of pre-answer Billing Records. One approach is to implement algorithms for detecting zero value Billing Records and then discarding them. The algorithm would be implemented in the originating LE and typical algorithms include:

(a) pre-answer phase of zero duration;
(b) call not answered, no chargeable supplementary services used during the pre-answer phase and the pre-answer phase duration below a pre-set threshold for the customer (this threshold is set in the User Service Profile);
(c) call answered, no chargeable supplementary services used during the pre-answer phase and the pre-answer phase during below a pre-set threshold for the customer (this threshold is set in the User Service Profile); and, (d) the network provider keeps a statistic for the ratio of answered calls to calls entering the pre-answer phase. If this ratio is not less than a pre-set threshold for the customer (this threshold would be in the User Service Profile) then the pre-answer Billing Record is discarded.

The formats and fields used are a matter for the network operator and as such the interface may be proprietary in nature. In order to describe the changes for the present invention, the network interface 38 in FIG. 3 is assumed to be an interface which provides the fields and features for usage metering information as described in prl-ETS 300 819. The introduction of the pre-answer data in the Billing Record means that the following parameters which are additional or changes to the parameters defined in prl-ETS 300 819 are required:

(1) Start Time Trigger. The trigger for the start time is one of the following, which is uniquely encoded within this parameter:
(i) receipt of ISUP Access delivery information parameter indicating "Set-up message generated" in a Call progress message;
(ii) receipt of ISUP Access delivery information parameter indicating "Set-up message generated" in an Address complete message;
(iii) receipt of ISUP Access delivery information parameter indicating "Set-up message generated" in an Answer message;
(iv) receipt of ISUP Access delivery information parameter indicating "Set-up message generated" in a Connect message;
(v) receipt of ISUP Access delivery information parameter indicating "Set-up message generated" in a Release message; and,
(vi) a default value. If set to this value it indicates that the pre-answer phase is not being timed and the "Start Time Stamp" has been set as currently defined in ETS 300 819, that is the trigger may be the seizure time for a non-answered call, or the answer time for answered calls or for transit calls the time will relate to the time the first message is received. This value allows backwards compatibility with the ETS definition of the "Start Time Stamp"; and,
(vii) receipt of ISUP call control message indicating "no set-up message generated" with "notification of forwarding generated". This advanced feature is described below with reference to call diversion services.

(2) Information Delivery Counter Value. The purpose of the counter is to record if a call is experiencing one or more instances of certain of the Call diversion supplementary services causing DSS1 Set-up information to be delivered to more than one User. The billing systems use this counter to provide a warning device rather than as a parameter to be charged against. For any customer, if the counter was repeatedly a high value it would indicate that the customer was using a mixture of services to provide a broadcast type function. If this occurred then the network provider would need to consider if the usage justified developing the appropriate pricing algorithms.

(3) Alerting Indication Received. This parameter would be set if the originating exchange receives either:
(i) an ISUP Address complete message indicating Asubscriber free≅ in the Called part status indicator of the Backward call indicators parameter; or,
(ii) an ISUP call progress message indicating Aalerting≅ in the Event indicator of the Event information parameter.

The ISUP Access delivery information parameter may be included in the message which causes the Alerting Indication Received Parameter to be set.

(4) Duration Time For The Pre-Answer Phase. This parameter contains the time that elapses between receipt of a AStart Time Trigger≅ and when either the time that an answer signal is received from the distant end, or if no answer signal is received, the time that the call is released. The conditions that cause the release at the originating end are the same as those described for the basic call. There are two special cases when the duration time will be zero. This occurs if the ISUP Access delivery information parameter initiating the pre-answer phase is received in an ISUP Connect message or, if the ISUP Access delivery information parameter initiating the pre-answer phase is received in an ISUP Release message.

(5) Start Time Stamp. This is an existing parameter in prl-ETS 300 819 and the definition is as defined in the ETS, with the addition that if the AStart Time Triggers≅ parameter is present in the billing record it is the time at which start time trigger indicated in the AStart Time Triggers≅ parameter is received.

Figure 6:
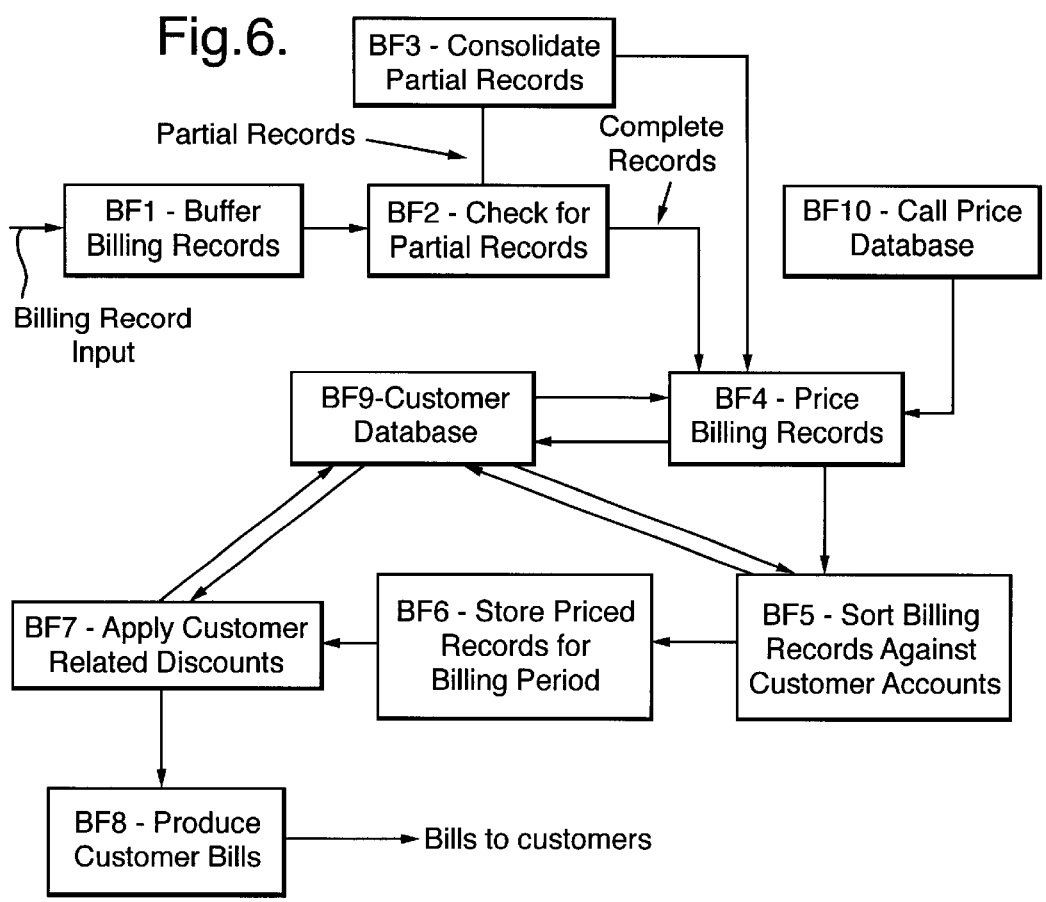
FIG. 6 is a schematic block diagram showing the functional elements in a billing centre.

A functional diagram of a typical billing centre is shown in FIG. 6. The functions which store the billing records between the processing functions has not been shown for the purposes of clarity. Implementation of the present invention will affect all the billing functions due to the increased volume and size of the billing records. The major impact on the billing centre is on the billing record pricing function and the customer related bulk price discounting function.

BF1—Buffer Billing Records. BF1 buffers the records that the billing centre has received from the originating LEs that it serves. The impact on this function is purely related to the increase in storage capacity arising from the increase in the number of billing records and the increase in size of the records resulting from the introduction of the facility for charging for calls in the pre-answer phase.

BF2—Check For Partial Billing Records. This is the function which checks for billing partial records and will be unchanged by the introduction of the facility for charging for calls in the pre-answer phase.

BF3—Consolidate Partial Billing Records. Where the network provider has a free format billing record the function which consolidates the partial billing records is unchanged by the introduction of the facility for charging for calls in the pre-answer phase. A network operator could provide the feature by capturing the data for the pre-answer phase in a partial billing record. In this case, all answered ISDN calls could be made up of partial records and the work carried out by this function would increase accordingly.

BF4—Price Billing Records. Each answered call needs to have the pre-answer phase priced in addition to the pricing of the answer phase. A link to the customer database is shown as there may be more than one pricing algorithm and details of the customer option would be needed to select the correct option.

BF5—Sort Billing Records Against Customer Accounts. This is the function which sorts billing records against customer accounts. It will need to be aware of billing records which have been unanswered but have details of the pre-answer phase.

BF6—Store Priced Records For Billing Period. This is the function which stores the priced records for the billing period. It will be affected by the increase in volume of priced billing records and the size of the billing records.

BF7—Apply Customer Related Discounts. One purpose of the present invention is to provide a function which is aimed at users who misuse the existing ISDN features.

Those customers who do not misuse the features will not want to pay more due to the introduction of charging for the pre-answer phase of the call. The network operator can introduce discounting for the feature in such a way that the charges to customers who do not misuse the network are not increased. Typical pricing algorithms are considered below.

BF8—Produce Customer Bills. This is the function which produces the customer bills. It will need to be modified so that charges for the pre-answer phase of the call can be shown on the bill.

BF9—Customer Database. The customer database needs to be able to store the pricing option that a customer had selected with regard to charging for the pre-answer phase of the call.

BF10—Call Price Database. This database needs to be able to store the pricing algorithm(s) for pricing the pre-answer phase of a call.

Customers who do not use the pre-answer phase for gaining information about the called party outside of the normal ISDN functions would not expect to be charged any more than at present and so would require a zero price option. A zero price option would mean that BF4 would have a zero price for the price of the pre-answer phase of the call. Customers having this option could deliberately misuse this and thereby take advantage of the network provider. Accordingly, BF7 may be provided with a policing feature which:

(i) bulks up the total time for the pre-answer phase of the call;
(ii) counts the total number of calls which are unanswered; and,
(iii) counts the total number of answered calls.

The policing feature would use the data to calculate the average time that calls are in the pre-answer phase and also the ratio of unanswered to answered calls. Any significant deviation from the norm would indicate that the customer was taking advantage of the pre-answer phase of the call and would provide a signal to the network operator to move the customer onto a pricing option.

An alternative option is to charge fixed fees for making use of the pre-answer phase of the call. For this option BF4 would zero price the pre-answer phase of the individual records whilst BF7 would bulk up the data relating to the customers usage of the pre-answer phase, as described above.

The pricing algorithm could be based in steps on the basis of how much the total time for the pre-answer phase exceeded the normal situation with each step having a fee. A similar stepped approach could be used in deciding on the fee relating to the frequency of usage based on how the number of unanswered calls exceeded the norm. This type of pricing algorithm is illustrated in FIG. 7.

As a further alternative, an algorithm may be applied which individually prices the pre-answer phase of each call for customers who want to have individually priced billing records. For this option BF4 would use the data in the call price database (BF10) to price the pre-answer phase. The method for pricing would need to take account of the relatively short duration=s that could occur for the pre-answer phase (e.g. pricing in per second increments). BF7 would provide a true discounting function in this case.

If the called user has activated the Call forwarding unconditional or the call forwarding on busy supplementary service and in addition has the Call diversion subscription option Aserved user receives notification that the call has been forwarded, then when "call forwarding unconditional" or "call forwarding on network determined busy" are invoked the called (ie diverting) user will receive information similar to that in the DSS1 Set-up message but coded in a DiversionInformation invoke component in a DSS1 Facility message. Delivery to the diverting user of this information is not within the scope of the current ISUP description for the use of the Access delivery information parameter.

The following describes an enhancement to ISUP and a modification of procedures described above to improve operation of the charging for the pre-answer phase of ISDN calls facility when encountering certain cases of call diversion supplementary services.

The preferred enhancement is to define bit B of the ISUP Access delivery information parameter as follows:

| bit | B Notification of forwarding delivery indicator |
|-----|--------------------------------------------------|
| 0   | no indication                                    |
| 1   | notification of forwarding generated             |

Note: the sense of the values 0/1 in bit B is the reverse of the sense for bit A to allow backward compatibility.

The present invention is not dependent on using bit B in the ISUP Access delivery information parameter. If it is not possible to agree this usage of bit B in the appropriate ITU-T forum then the same function could be performed by a different bit in the Access delivery information parameter, or by a new parameter (e.g. in the national range of ISUP parameter codepoints if International agreement cannot be achieved).

The introduction of the present invention will not require a change to the ISUP parameter compatibility information parameter instruction associated with the ISUP Access delivery information parameter. A suitable coding is as follows:

| i) | $N^{th}$ upgraded parameter |
|----|-------------------------------|
| 0010 1110 | Access delivery information |
| ii) | Instruction indicators |
| bit | A: Transit at intermediate exchange indicator |
| 0 | transit interpretation |
| bit | B: Release call indicator |
| 0 | do not release call |
| bit | C: Send notification indicator |
| 0 | do not send notification |
| bit | D: Discard message indicator |
| 0 | do not discard message (pass on) |
| bit | E Discard parameter indicator |
| 0 | do not discard parameter (pass on) |
| bits | GF: Pass on not possible indicator |
| 10 | discard parameter |
| iii) | Extension indicator |
| 1 | last octet. |

If the called user has activated one or more Call diversion supplementary services, the action of the call control logic at the LE serving the diverting user depends on:

(i) whether or not a DSS1 Set-up message is delivered to the diverting User as part of the call diversion supplementary service; and,
(ii) whether or not the user has the Call diversion subscription option Aserved user receives notification that a call has been forwarded=.

If a DSS1 Set-up message is delivered to the called (ie potentially diverting) user (e.g. in advance of Call forwarding on user determined busy, Call forwarding on no reply, or Call deflection), then the normal procedure described above applies.

If a DSS1 Set-up message is not delivered to the called (ie potentially diverting) user (e.g. as a result of Call forwarding on network determined busy, or Call forwarding unconditional) and the diverting user does not have the Call diversion subscription option Aserved user receives notification that a call has been forwarded≈, then the normal procedure described above applies.

If a DSS1 Set-up message is not delivered to the called (ie potentially diverting) user (e.g. as a result of Call forwarding on network determined busy, or Call forwarding unconditional) and the diverting User has the Call diversion subscription option Aserved user receives notification that a call has been forwarded≈, then when the call control logic in the LE serving this user determines that the DSS1 Facility message including the DiversionInformation invoke component has been delivered towards the diverting user by the access signalling system, then the ISUP call control message which includes the Call diversion information parameter sent towards the originating exchange also includes an Access delivery information parameter indicating in bit A "Set-up message generated" and in bit B Anotification of forwarding generated. Note that following Call diversion, the forwarded to LE will act as a called LE or a subsequent diverting LE as appropriate.

At the originating LE the pre-answer phase is initiated as a result of receiving the first ISUP Access delivery information parameter indicating either "Set-up message generated" or "notification of forwarding generated". In the latter case, the pre-answer initiating event is recorded as Access delivery information parameter indicating "notification of forwarding generated" plus the ISUP message type conveying the indication. During the pre-answer phase the information delivery counter is incremented by both the receipt of any "Set-up message generated" indication and any "notification of forwarding generated" indication.

Figure 8:
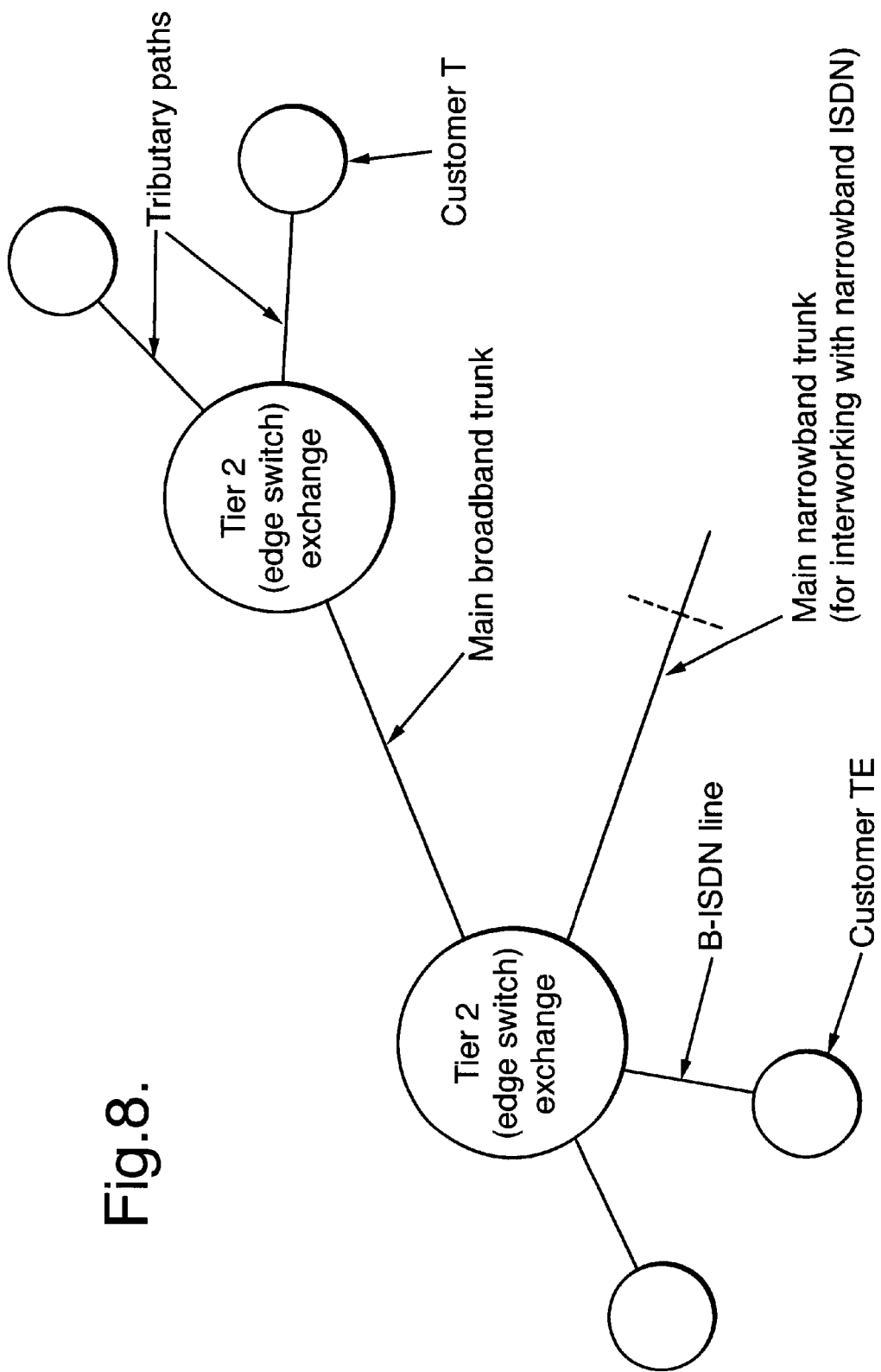
FIG. 8 shows a broadband ISDN network implementing the invention.

As noted above, the invention may be applied in a number of different networks. FIG. 8 shows a further example of a network in which pre-answer phase billing may be implemented. In this example, the network is a B-ISDN (broadband-integrated services digital network) system. It functions in a manner broadly similar to the narrowband ISDN network discussed above. However, the local exchange referred to in the narrowband network is replaced by a tier 2 (edge switch) exchange and the intermediate exchange is replaced by tier 1 exchange. Whereas ISUP (ISDN user part) was the signalling protocol used in the narrowband network, B-ISUP (broadband-ISDN user part) is used in the broadband network of FIG. 8 and on the access network DSS2 signalling is used in place of DSS1 signalling. B-ISUP signals and procedures are defined in ITU-T recommendations Q.2761, Q.2762, Q.276 3 and Q.2764. DSS2 signals and procedures are defined in ITU-T recommendation Q.2931. Interworking between B-ISUP and DSS2 is defined in ITU-T recommendation Q.2650 and interworking between B-ISUP and N-ISUP is defined in ITU-T recommendation Q.2660. In operation, the network functions generally as described above, with B-ISUP signalling events associated with the initial generation of a set-up message and the subsequent indication that the called customer has answered or that the call has been released being used to trigger a call duration timer that records the duration of the pre-answer phase, as well as the duration of the answer phase, should the call be answered.

What is claimed is:

1. A method of monitoring a communications network to detect possible abuse of the pre-answer phase of setting up a call over the network, said method comprising:

recording data representing the time duration and state of completion of at least one pre-answer phase during a call set-up process, accumulating said recorded data for a plurality of call set-up processes; and generating statistical data representing the number of call set-up processes involving predetermined time durations and states of completion.

2. A method as in claim 1 wherein said generated statistical data represents the number of calls having pre-answer phases of predetermined duration that were answered and that were not answered.

3. A method as in claim 2 wherein said generated statistical data represents the numbers of calls having less than each of plural different predetermined durations and that were answered and not answered.

4. A method of monitoring a communications network to detect possible abuse of a pre-answer phase during normally non-chargeable call set-up processes where a signal coming from called customers premises equipment may nevertheless represent information of interest to the calling party, said method comprising:

accumulating data representing normally non-charged call set-up processes; and generating statistical data based on said accumulated data that is useful in identifying possible abuse of the pre-answer phase by a calling party that is gathering useful information without incurring corresponding telecommunications charges.

5. Apparatus for monitoring a communications network to detect possible abuse of the pre-answer phase of setting up a call over the network, said apparatus comprising:

means for recording data representing the time duration and state of completion of at least one pre-answer phase during a call set-up process, means for accumulating said recorded data for a plurality of call set-up processes; and means for generating statistical data representing the number of call set-up processes involving predetermined time durations and states of completion.

6. Apparatus as in claim 5 wherein said generated statistical data represents the number of calls having pre-answer phases of predetermined duration that were answered and that were not answered.

7. Apparatus as in claim 6 wherein said generated statistical data represents the numbers of calls having less than each of plural different predetermined durations and that were answered and not answered.

8. Apparatus for monitoring a communications network to detect possible abuse of a pre-answer phase during normally non-chargeable call set-up processes where a signal coming from called customers premises equipment may nevertheless represent information of interest to the calling party, said apparatus comprising:

means for accumulating data representing normally non-charged call set-up processes; and means for generating statistical data based on said accumulated data that is useful in identifying possible abuse of the pre-answer phase by a calling party that is gathering useful information without incurring corresponding telecommunication charges.

* * * * *